US009459788B2

(12) United States Patent
Kang et al.

(10) Patent No.: US 9,459,788 B2
(45) Date of Patent: Oct. 4, 2016

(54) MOBILE TERMINAL FOR CHANGING DISPLAY MODE OF AN APPLICATION BASED ON A USER INPUT OPERATION AND OPERATION CONTROL METHOD THEREOF

(75) Inventors: Raehoon Kang, Seoul (KR); Jiyoun Lee, Seoul (KR); Hyungtae Jang, Seoul (KR); Seokjin Jang, Seoul (KR); Choonjae Lee, Seoul (KR); Minjeong Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 683 days.

(21) Appl. No.: 13/169,849

(22) Filed: Jun. 27, 2011

(65) Prior Publication Data
US 2012/0159386 A1    Jun. 21, 2012

(30) Foreign Application Priority Data
Dec. 21, 2010 (KR) .................. 10-2010-0131630

(51) Int. Cl.
*G06F 3/0481* (2013.01)
*G06F 3/0488* (2013.01)

(52) U.S. Cl.
CPC ......... *G06F 3/04883* (2013.01); *G06F 3/0481* (2013.01); *G06F 2203/04806* (2013.01)

(58) Field of Classification Search
CPC .................. G06F 3/0481; G06F 3/04845
USPC ......................................................... 715/800
See application file for complete search history.

(56) References Cited

U.S. PATENT DOCUMENTS

| 5,684,969 | A  | * | 11/1997 | Ishida ........................... 715/800 |
| 5,838,317 | A  | * | 11/1998 | Bolnick et al. ............... 715/764 |
| 6,300,947 | B1 | * | 10/2001 | Kanevsky ...................... 715/866 |
| 6,501,487 | B1 | * | 12/2002 | Taguchi ........................ 715/788 |
| 7,812,826 | B2 | * | 10/2010 | Ording et al. ................. 345/173 |
| 7,844,913 | B2 | * | 11/2010 | Amano et al. ................ 715/769 |
| 7,949,954 | B1 | * | 5/2011  | Jezek, Jr. ..................... 715/800 |
| 7,992,103 | B2 | * | 8/2011  | Gusmorino et al. .......... 715/835 |
| 8,464,177 | B2 | * | 6/2013  | Ben-Yoseph et al. ........ 715/800 |
| 2005/0068290 | A1 | * | 3/2005 | Jaeger ........................... 345/156 |

(Continued)

FOREIGN PATENT DOCUMENTS

CN          101379461 A    3/2009
WO    WO 2006/020305 A2   2/2006

(Continued)

*Primary Examiner* — Alvin Tan
(74) *Attorney, Agent, or Firm* — Birch, Stewart, Kolasch & Birch, LLP

(57) ABSTRACT

A method of controlling a mobile terminal including allowing, via a wireless communication unit on the mobile terminal, wirelessly communication with at least one other terminal; displaying, on a display of the mobile terminal, an application screen corresponding to an execution of an application on the mobile terminal; reducing, via a controller on the mobile terminal, a size of the application screen in response to a reduction input operation performed on the mobile terminal; determining, via the controller, if the application screen is reduced below a predetermined size; displaying, via the display, a widget corresponding to the application instead of the application screen on the display when the application screen is reduced below the predetermined size; and expanding, via the controller, the application screen back to its original size before the reduction input operation has been performed when the application screen is not reduced below the predetermined size.

19 Claims, 18 Drawing Sheets

(56) References Cited

U.S. PATENT DOCUMENTS

| | | |
|---|---|---|
| 2006/0236264 A1* | 10/2006 | Cain et al. ............ 715/788 |
| 2007/0152984 A1 | 7/2007 | Ording et al. |
| 2008/0235602 A1* | 9/2008 | Strauss et al. ............ 715/762 |
| 2009/0100361 A1 | 4/2009 | Abello et al. |
| 2010/0313129 A1* | 12/2010 | Hyman ............ 715/719 |
| 2012/0046075 A1* | 2/2012 | Griffin ............ 455/566 |
| 2012/0159402 A1* | 6/2012 | Nurmi et al. ............ 715/863 |

FOREIGN PATENT DOCUMENTS

| | | |
|---|---|---|
| WO | WO 2008/086056 A2 | 7/2008 |
| WO | WO 2008/131417 A1 | 10/2008 |
| WO | WO 2010/035180 A2 | 4/2010 |

* cited by examiner

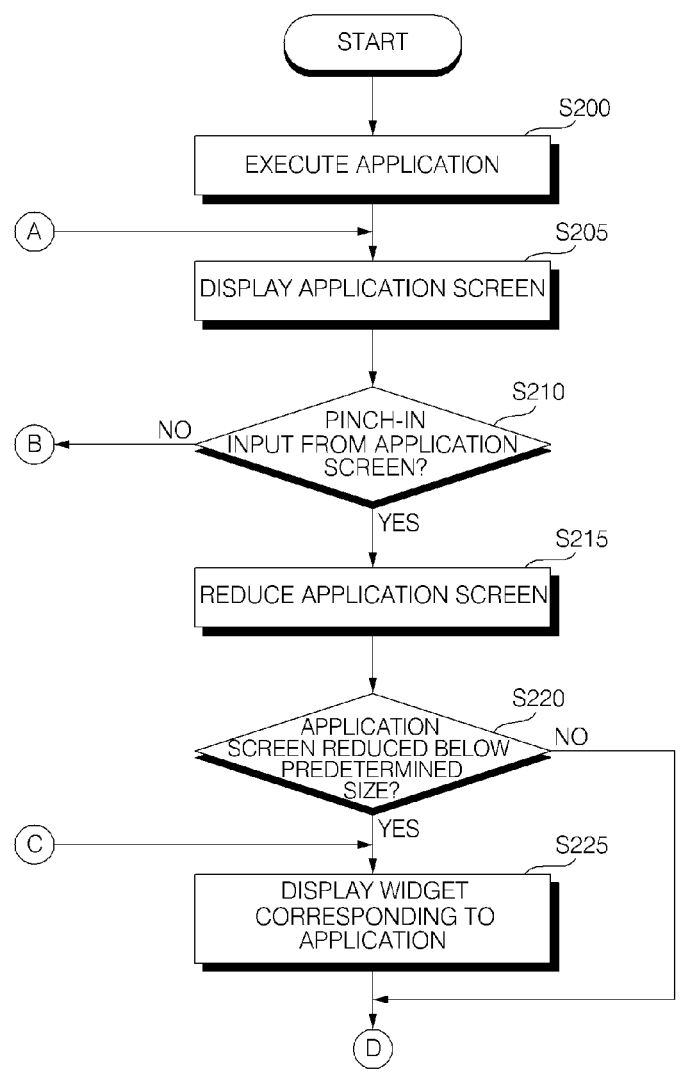

FIG. 7
(a) 
(b) 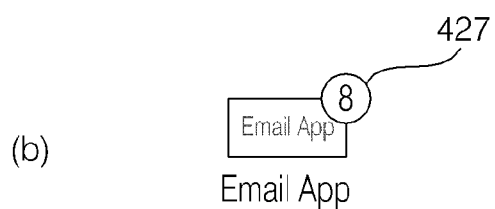

(a)          (b)

FIG. 12
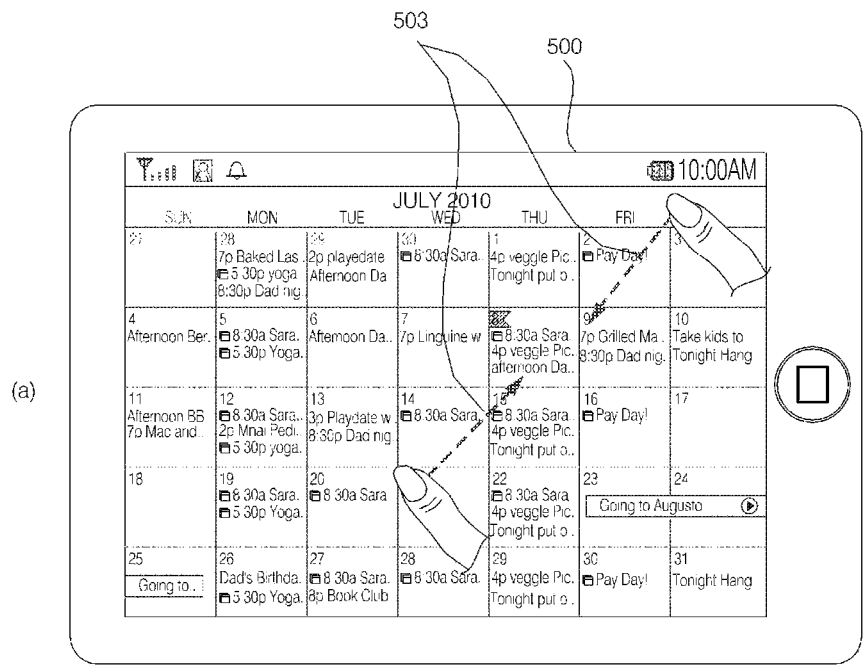
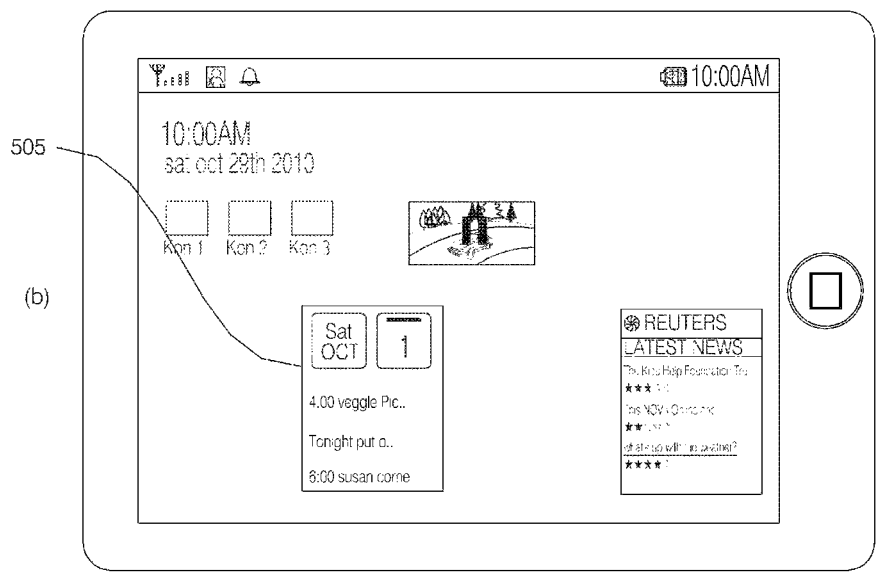

FIG. 14
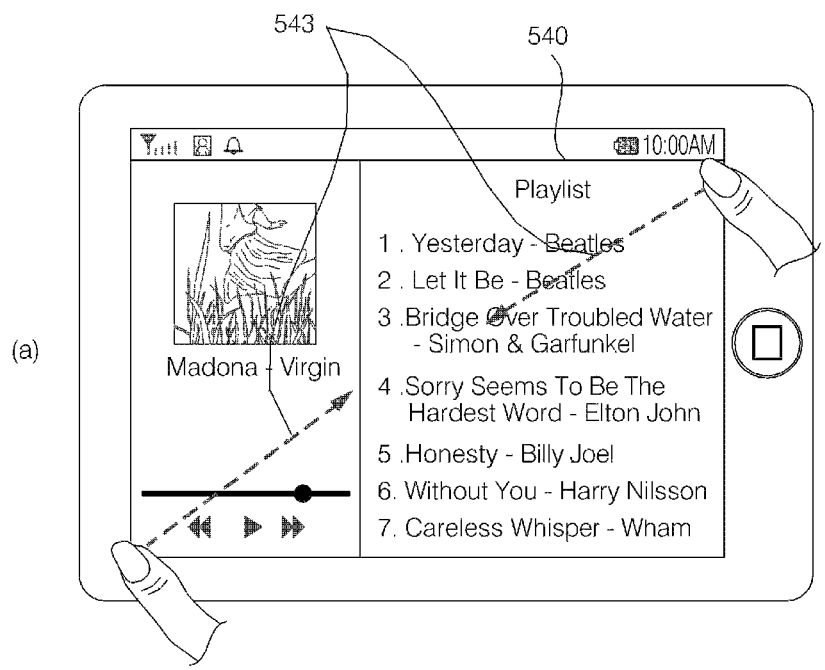
(a)
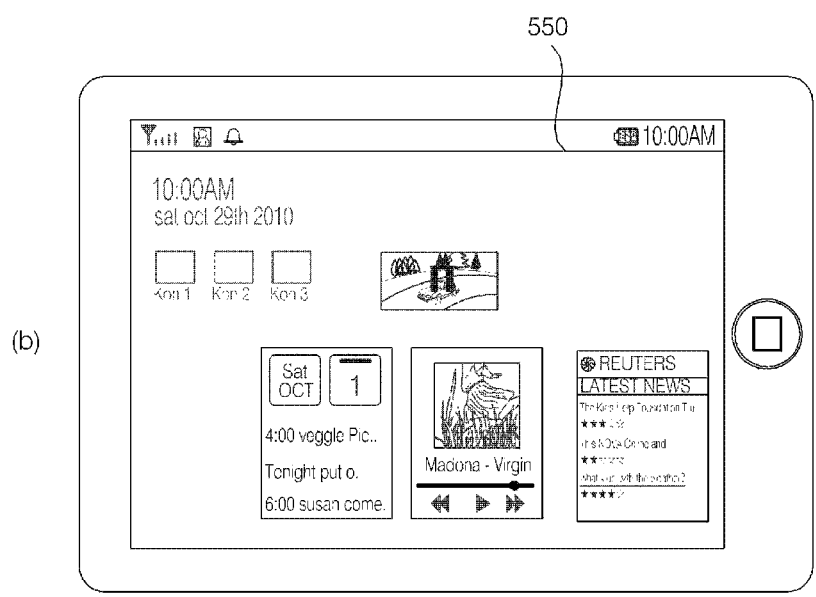
(b)

FIG. 15
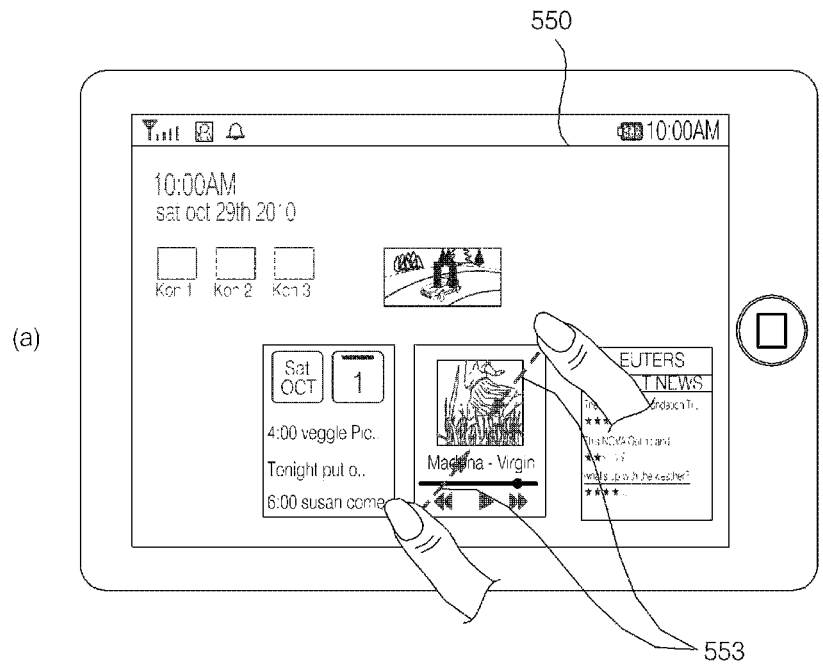
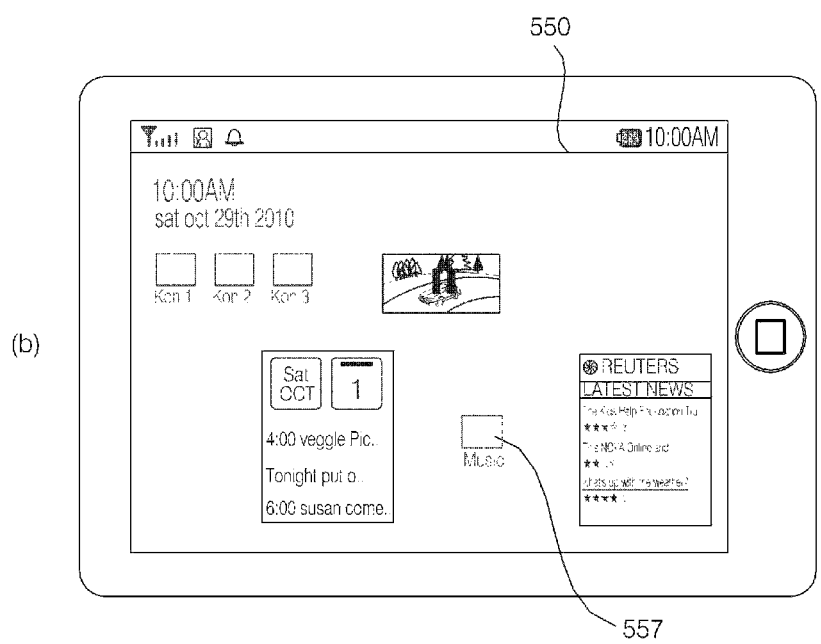

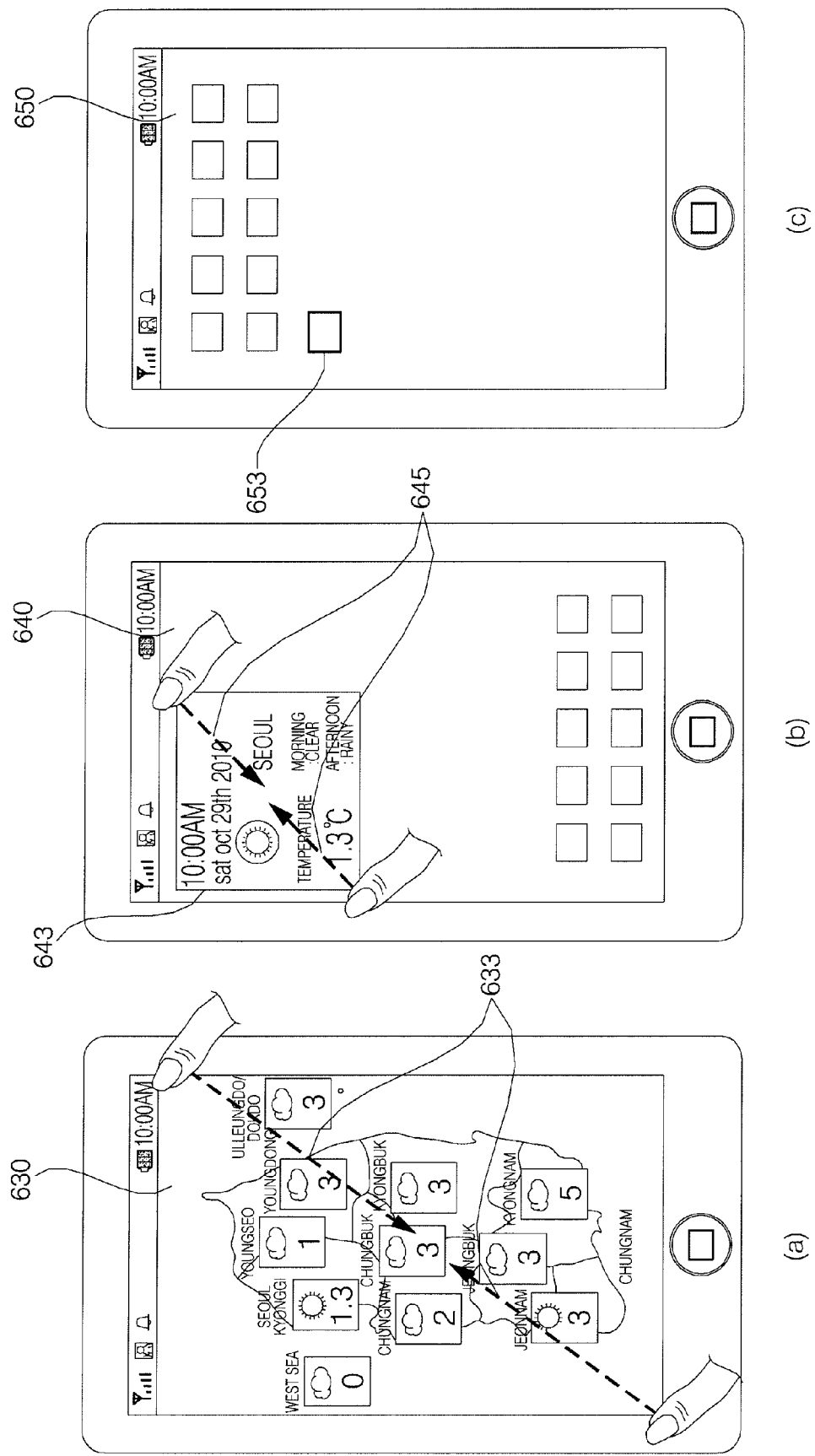

MOBILE TERMINAL FOR CHANGING DISPLAY MODE OF AN APPLICATION BASED ON A USER INPUT OPERATION AND OPERATION CONTROL METHOD THEREOF

CROSS-REFERENCE TO A RELATED APPLICATION

This application claims the priority benefit of Korean Patent Application No. 10-2010-0131630, filed on Dec. 21, 2010 in the Korean Intellectual Property Office, the disclosure of which is incorporated herein by reference.

BACKGROUND OF THE INVENTION

1. Field of the Invention

The present invention relates to a mobile terminal and corresponding control method, in which various operations performed by the mobile terminal can be effectively controlled using a pinch-in or pinching-out input operation.

2. Description of the Related Art

Mobile terminals are portable devices providing users with various services such as a voice calling service, a video calling service, an information input/output service, and a data storage service. Mobile terminals also provide many additional functions besides the basic calling function such as capturing photos or moving pictures, playing music files or moving image files, providing game programs, receiving broadcast programs and providing wireless internet services. Thus, mobile terminals are now multimedia players.

In addition, various user interface (UI) environments allowing users to easily search for and choose desired functions have been developed. Mobile terminals have also become personal items that can represent personal individuality. Touch screens are also common in mobile terminals.

However, even mobile terminals equipped with touch screens require users to navigate through numerous menus to perform certain functions or operations, and thus causes inconvenience.

SUMMARY OF THE INVENTION

Accordingly, one object of the present invention is to address the above noted and other problems with the related art.

Another object of the present invention is to provide a mobile terminal and corresponding control method for effectively performing various operations using a pinching-in or pinching-out input operation.

To achieve these and other advantages and in accordance with the purpose of the present invention, as embodied and broadly described herein, the present invention provides in one aspect a method of controlling a mobile terminal including allowing, via a wireless communication unit on the mobile terminal, wirelessly communication with at least one other terminal; displaying, on a display of the mobile terminal, an application screen corresponding to an execution of an application on the mobile terminal; reducing, via a controller on the mobile terminal, a size of the application screen in response to a reduction input operation performed on the mobile terminal; determining, via the controller, if the application screen is reduced below a predetermined size; displaying, via the display, a widget corresponding to the application instead of the application screen on the display when the application screen is reduced below the predetermined size; and expanding, via the controller, the application screen back to its original size before the reduction input operation has been performed when the application screen is not reduced below the predetermined size.

In another aspect, the present invention provides a mobile terminal including a wireless communication unit configured to wirelessly communicate with at least one other terminal; a display configured to display an application screen corresponding to an execution of an application on the mobile terminal; and a controller configured to reduce a size of the application screen in response to a reduction input operation performed on the mobile terminal, to determine if the application screen is reduced below a predetermined size, to control the display to display a widget corresponding to the application instead of the application screen on the display when the application screen is reduced below the predetermined size, and to expand the application screen back to its original size before the reduction input operation has been performed when the application screen is not reduced below the predetermined size.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The above and other features and advantages of the present invention will become more apparent by describing in detail preferred embodiments thereof with reference to the attached drawings in which:

FIGS. 3A and 3B are flowcharts illustrating a method of controlling a mobile terminal according to an embodiment of the present invention;

FIGS. 5 through 17 are diagrams illustrating display screens for explaining the embodiments of FIGS. 3A and 3B.

DETAILED DESCRIPTION OF THE INVENTION

The present invention will hereinafter be described in detail with reference to the accompanying drawings in which embodiments of the invention are shown. The term 'mobile terminal' as used herein may indicate a mobile phone, a smart phone, a laptop computer, a digital broadcast receiver, a personal digital assistant (PDA), a portable multimedia player (PMP), a camera, a navigation device, a tablet computer, or an electronic book (e-book) reader. In this disclosure, the terms 'module' and 'unit' can be used interchangeably.

Figure 1:
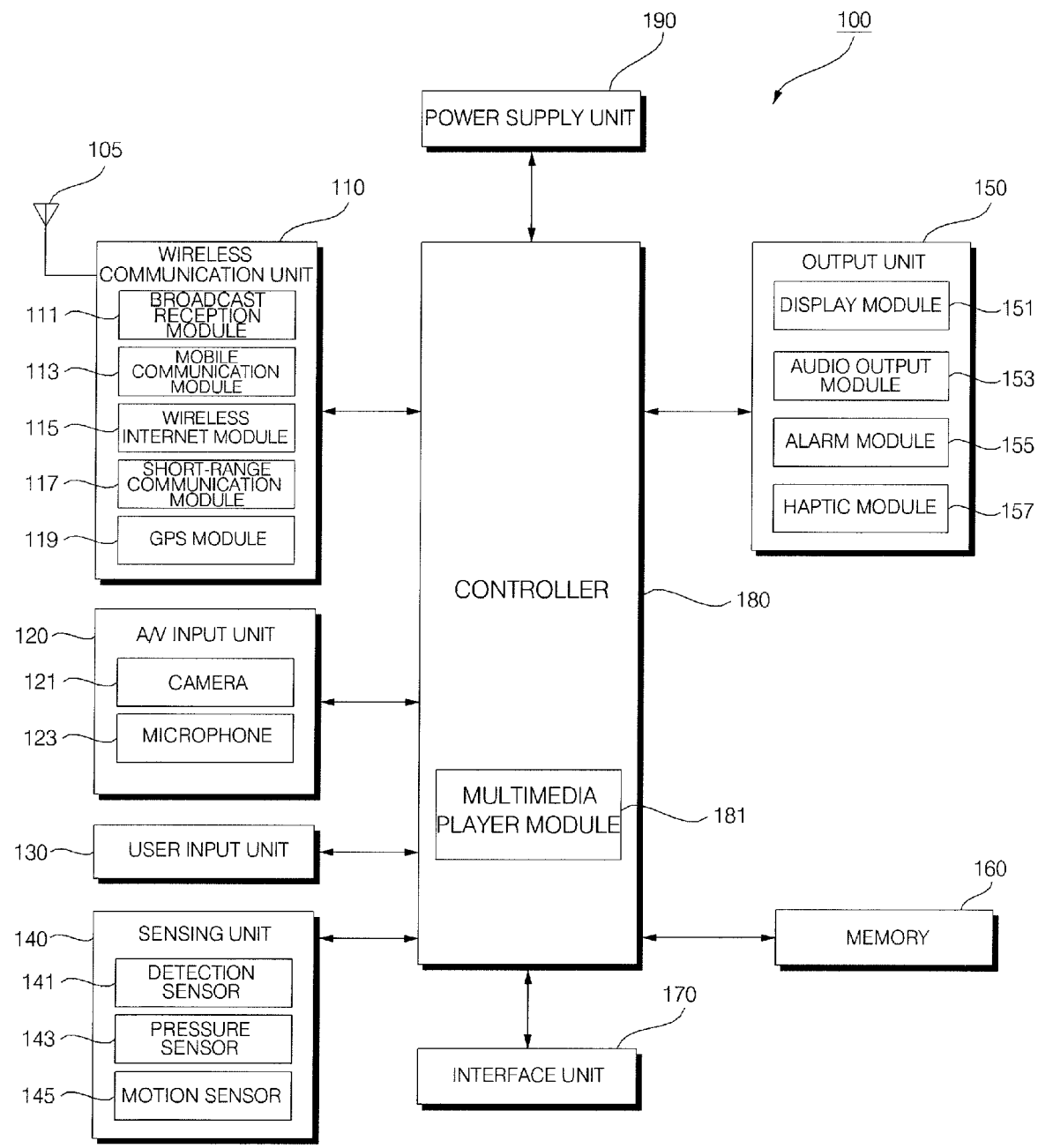
FIG. 1 is a block diagram of a mobile terminal according to an embodiment of the present invention.

FIG. 1 illustrates a block diagram of a mobile terminal 100 according to an embodiment of the present invention. Referring to FIG. 1, the mobile terminal 100 includes a wireless communication unit 110, an audio/video (A/V) input unit 120, a user input unit 130, a sensing unit 140, an output unit 150, a memory 160, an interface unit 170, a controller 180, and a power supply unit 190. Two or more of the wireless communication unit 110, the A/V input unit 120, the user input unit 130, the sensing unit 140, the output unit 150, the memory 160, the interface unit 170, the controller 180, and the power supply unit 190 may be incorporated into a single unit, or some of the wireless communication unit 110, the A/V input unit 120, the user input unit 130, the sensing unit 140, the output unit 150, the memory 160, the interface unit 170, the controller 180, and the power supply unit 190 may be divided into two or more smaller units.

Further, the wireless communication unit 110 includes a broadcast reception module 111, a mobile communication module 113, a wireless internet module 115, a short-range communication module 117, and a global positioning system (GPS) module 119. In addition, the broadcast reception module 111 can receive a broadcast signal and/or broadcast-related information from an external broadcast management server through a broadcast channel. The broadcast channel may be a satellite channel or a terrestrial channel. The broadcast management server may be a server which generates broadcast signals and/or broadcast-related information and transmits the generated broadcast signals and/or the generated broadcast-related information or may be a server which receives and then transmits previously-generated broadcast signals and/or previously-generated broadcast-related information.

In addition, the broadcast-related information may include broadcast channel information, broadcast program information and/or broadcast service provider information. The broadcast signal may be a TV broadcast signal, a radio broadcast signal, a data broadcast signal, the combination of a data broadcast signal and a TV broadcast signal or the combination of a data broadcast signal and a radio broadcast signal. The broadcast-related information may also be provided to the mobile terminal 100 through a mobile communication network. In this instance, the broadcast-related information may be received by the mobile communication module 113, rather than by the broadcast reception module 111. The broadcast-related information may also come in various forms such as an electronic program guide (EPG) of the digital multimedia broadcasting (DMB) system or an electronic service guide (ESG) of the digital video broadcast-handheld (DVB-H) system.

In addition, the broadcast reception module 111 may receive the broadcast signal using various broadcasting systems such as the digital multimedia broadcasting-terrestrial (DMB-T) system, the digital multimedia broadcasting-satellite (DMB-S) system, the media forward link only (MediaFLO) system, the DVB-H system, and the integrated services digital broadcast-terrestrial (ISDB-T) system. In addition, the broadcast reception module 111 may be configured to be suitable for nearly all types of broadcasting systems other than those set forth herein. The broadcast signal and/or the broadcast-related information received by the broadcast reception module 111 may also be stored in the memory 160.

The mobile communication module 113 can also transmit wireless signals to or receives wireless signals from at least one of a base station, an external terminal, and a server through a mobile communication network. The wireless signals may include various types of data according to whether the mobile terminal 100 transmits/receives voice call signals, video call signals, or text/multimedia messages.

The wireless internet module 115 corresponds to a module for wirelessly accessing the internet. The wireless internet module 115 may be embedded in the mobile terminal 100 or may be installed in an external device. The wireless internet module 115 may also use various wireless internet technologies such as wireless local area network (WLAN), Wireless Broadband (WiBro), World Interoperability for Microwave Access (Wimax), and High Speed Downlink Packet Access (HSDPA).

Further, the short-range communication module 117 is a module for short-range communication and may use various short-range communication techniques such as Bluetooth, radio frequency identification (RFID), infrared data association (IrDA), ultra wideband (UWB), and ZigBee. The GPS module 119 also receives position information from a plurality of GPS satellites.

In addition, the A/V input unit 120 may be used to receive audio signals or video signals. In FIG. 1, the A/V input unit 120 includes a camera 121 and a microphone 123. The camera 121 can process various image frames such as still images or moving images captured by an image sensor during a video call mode or an image capturing mode, and the image frames processed by the camera 121 may be displayed by a display module 151. The image frames processed by the camera 121 may also be stored in the memory 160 or may be transmitted to an external device through the wireless communication unit 110. The mobile terminal 100 may also include two or more cameras 121.

Further, the microphone 123 can receive external sound signals during a call mode, a recording mode, or a voice recognition mode with the use of a microphone and convert the sound signals into electrical sound data. In the call mode, the mobile communication module 113 converts the electrical sound data into data that can be readily transmitted to a mobile communication base station and then output the data obtained by the conversion. The microphone 123 may also use various noise removal algorithms to remove noise that may be generated during the reception of external sound signals.

Also, the user input unit 130 may generate key input data based on user input for controlling the operation of the mobile terminal 100. The user input unit 130 may be implemented as a keypad, a dome switch, or a static pressure or capacitive touch pad which is capable of receiving a command or information by being pushed or touched by a user. Alternatively, the user input unit 130 may be implemented as a wheel, a jog dial or wheel, or a joystick capable of receiving a command or information by being rotated. Still alternatively, the user input unit 130 may be implemented as a finger mouse. In particular, when the user input unit 130 is implemented as a touch pad and forms a mutual layer structure with the display module 151, the user input unit 130 and the display module 151 may be collectively referred to as a touch screen.

Further, the sensing unit 140 determines a current state of the mobile terminal 100 such as whether the mobile terminal 100 is opened or closed, the position of the mobile terminal 100 and whether the mobile terminal 100 is placed in contact with a user, and generates a sensing signal for controlling the operation of the mobile terminal 100. For example, when the mobile terminal 100 is a slider-type mobile phone, the sensing unit 140 can determine whether the mobile terminal 100 is opened or closed. In addition, the sensing unit 140 can determine whether the mobile terminal 100 is powered by the power supply unit 190 and whether the interface unit 170 is connected to an external device.

In addition, in FIG. 1, the sensing unit 140 includes a detection sensor 141, a pressure sensor 143 and a motion sensor 145. The detection sensor 141 determines whether there is an object nearby and approaching the mobile terminal 100 without any mechanical contact. More specifically, the detection sensor 141 can detect an object that is nearby and approaching by detecting a change in an alternating magnetic field or the rate of change of static capacitance. The sensing unit 140 may also include two or more detection sensors 141.

Further, the pressure sensor 143 determines whether pressure is being applied to the mobile terminal 100 or measures the level of pressure, if any, applied to the mobile terminal 100. The pressure sensor 143 may be installed in a certain part of the mobile terminal 100 where the detection of pressure is necessary. For example, the pressure sensor 143 may be installed in the display module 151. In this instance, it is possible to differentiate a typical touch input from a pressure touch input, which is generated using a higher pressure level than that used to generate a typical touch input, based on data provided by the pressure sensor 143. In addition, when a pressure touch input is received through the display module 151, it is possible to determine the level of pressure applied to the display module 151 upon the detection of a pressure touch input based on data provided by the pressure sensor 143.

Also, the motion sensor 145 determines the location and motion of the mobile terminal 100 using an acceleration sensor or a gyro sensor, for example. In more detail, acceleration sensors are a type of device for converting a vibration in acceleration into an electric signal. With recent developments in micro-electromechanical system (MEMS) technology, acceleration sensors have been widely used in various products for various purposes ranging from detecting large motions such as car collisions as performed in airbag systems for automobiles to detecting minute motions such as the motion of the hand as performed in gaming input devices.

In general, one or more acceleration sensors representing two or three axial directions are incorporated into a single package. There are some cases when the detection of only one axial direction, for example, a Z-axis direction, is necessary. Thus, when an X- or Y-axis acceleration sensor instead of a Z-axis acceleration sensor is required, the X- or Y-axis acceleration sensor may be mounted on an additional substrate, and the additional substrate may be mounted on a main substrate. In addition, gyro sensors measure angular velocity, and may determine the relative direction of the rotation of the mobile terminal 100 to a reference direction.

Also, the output unit 150 can output audio signals, video signals and alarm signals, and in FIG. 1, includes the display module 151, an audio output module 153, an alarm module 155, and a haptic module 157. Further, the display module 151 displays various information processed by the mobile terminal 100. For example, when the mobile terminal 100 is in a call mode, the display module 151 can display a user interface (UI) or a graphic user interface (GUI) for making or receiving a call. When the mobile terminal 100 is in a video call mode or an image capturing mode, the display module 151 can display a UI or a GUI for capturing or receiving images.

In addition, when the display module 151 and the user input unit 130 form a layer structure together and are thus implemented as a touch screen, the display module 151 may be used as both an output device and an input device. When the display module 151 is implemented as a touch screen, the display module 151 may also include a touch screen panel and a touch screen panel controller. In more detail, the touch screen panel is a transparent panel attached onto the exterior of the mobile terminal 100 and may be connected to an internal bus of the mobile terminal 100.

The touch screen panel also continuously monitors whether the touch screen panel is being touched by the user. Once a touch input to the touch screen panel is received, the touch screen panel transmits a number of signals corresponding to the touch input to the touch screen panel controller. The touch screen panel controller then processes the signals transmitted by the touch screen panel, and transmits the processed signals to the controller 180. Then, the controller 180 determines whether a touch input has been generated and which part of the touch screen panel has been touched based on the processed signals transmitted by the touch screen panel controller.

The display module 151 may include electronic paper (e-paper). In particular, e-paper is a type of reflective display technology and can provide as high resolution as ordinary ink on paper, wide viewing angles, and excellent visual properties. E-paper can also be implemented on various types of substrates such as a plastic, metallic or paper substrate and can display and maintain an image thereon even after power is cut off. In addition, e-paper can reduce the power consumption of the mobile terminal 100 because it does not require a backlight assembly. The display module 151 may be implemented as e-paper by using electrostatic-charged hemispherical twist balls, using electrophoretic deposition, or using microcapsules.

Further, the display module 151 may include at least one of a liquid crystal display (LCD), a thin film transistor (TFT)-LCD, an organic light-emitting diode (OLED), a flexible display, and a three-dimensional (3D) display. The mobile terminal 100 may also include two or more display modules 151. For example, the mobile terminal 100 may include an external display module and an internal display module.

Also, the audio output module 153 outputs audio data received by the wireless communication unit 110 during a call reception mode, a call mode, a recording mode, a voice recognition mode, or a broadcast reception mode or outputs audio data present in the memory 160. In addition, the audio output module 153 may output various sound signals associated with the functions of the mobile terminal 100 such as receiving a call or a message. The audio output module 153 may also include a speaker and a buzzer.

The alarm module 155 outputs an alarm signal indicating the occurrence of an event in the mobile terminal 100. Examples of the event include receiving a call signal, receiving a message, and receiving a key signal. Examples of the alarm signal output by the alarm module 155 include an audio signal, a video signal and a vibration signal. More specifically, the alarm module 155 may output an alarm signal upon receiving a call signal or a message. In addition, the alarm module 155 may receive a key signal and may output an alarm signal as feedback to the key signal. Therefore, the user can easily recognize the occurrence of an event based on an alarm signal output by the alarm module 155. An alarm signal for notifying the user of the occurrence of an event may be output not only by the alarm module 155 but also by the display module 151 or the audio output module 153.

In addition, the haptic module 157 provides various haptic effects such as vibration that can be perceived by the user. When the haptic module 157 generates vibration as a haptic effect, the intensity and the pattern of vibration generated by the haptic module 157 may be altered in various manners. The haptic module 157 can also synthesize different vibration effects and output the result of the synthesization. Alternatively, the haptic module 157 can sequentially output different vibration effects.

Further, the haptic module 157 can provide various haptic effects, other than vibration, such as a haptic effect obtained using a pin array that moves perpendicularly to a contact skin surface, a haptic effect obtained by injecting or sucking in air through an injection hole or a suction hole, a haptic effect obtained by giving a stimulus to the surface of the skin, a haptic effect obtained through contact with an electrode, a haptic effect obtained using an electrostatic force, and a haptic effect obtained by realizing the sense of heat or cold using a device capable of absorbing heat or generating heat. The haptic module 157 may be configured to enable the user to recognize a haptic effect using the kinesthetic sense of the fingers or the arms. The mobile terminal 100 may also include two or more haptic modules 157.

Also, the memory 160 stores various programs necessary for the operation of the controller 180. In addition, the memory 160 may temporarily store various data such as a phonebook, messages, still images, or moving images. In addition, the memory 160 may include at least one of a flash memory type storage medium, a hard disk type storage medium, a multimedia card micro type storage medium, a card type memory (e.g., a secure digital (SD) or extreme digital (XD) memory), a random access memory (RAM), and a read-only memory (ROM). The mobile terminal 100 may also operate a web storage on the interne, which performs the functions of the memory 160.

Further, the interface unit 170 can interface with an external device that can be connected to the mobile terminal 100. The interface unit 170 may be a wired/wireless headset, an external battery charger, a wired/wireless data port, a card socket for, for example, a memory card, a subscriber identification module (SIM) card or a user identity module (UIM) card, an audio input/output (I/O) terminal, a video I/O terminal, or an earphone. The interface unit 170 can also receive data from an external device or may be powered by an external device, and transmit data provided by an external device to other components in the mobile terminal 100 or transmit data provided by other components in the mobile terminal 100 to an external device. When the mobile terminal 100 is connected to an external cradle, the interface unit 170 provides a path for supplying power from the external cradle to the mobile terminal 100 or for transmitting various signals from the external cradle to the mobile terminal 100.

Also, the controller 180 controls the general operation of the mobile terminal 100. For example, the controller 180 can perform various control operations regarding making/receiving a voice call, transmitting/receiving data, or making/receiving a video call. In FIG. 1, the controller 180 includes a multimedia player module 181, which plays multimedia data. The multimedia player module 181 may be implemented as a hardware device and may be installed in the controller 180. Alternatively, the multimedia player module 181 may be implemented as a software program.

Further, the power supply unit 190 may be supplied with power by an external power source or an internal power source and may supply power to the other components in the mobile terminal 100. The mobile terminal 100 may also operated with a wired/wireless communication system or a satellite communication system and thus operate in a communication system capable of transmitting data in units of frames or packets.

Figure 2:
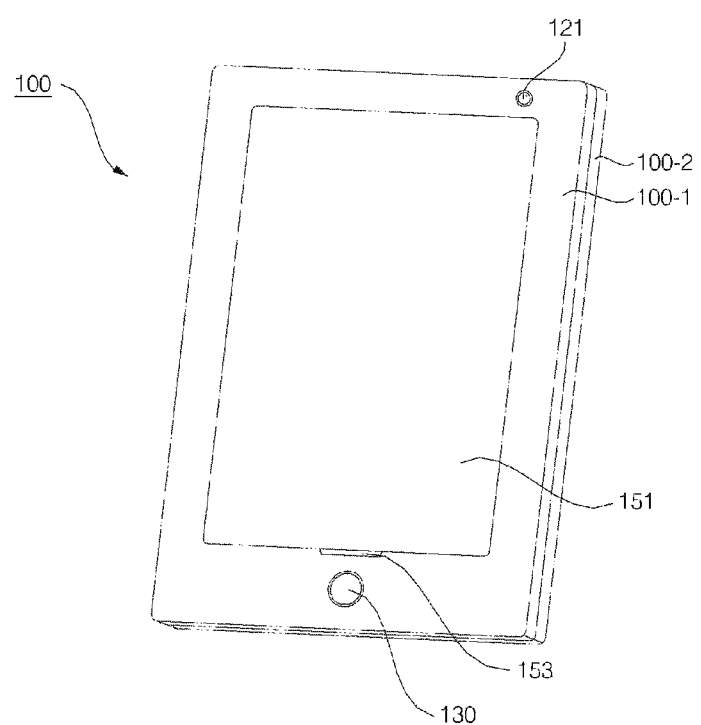
FIG. 2 is a front perspective view of the mobile terminal shown in FIG. 1.

The exterior structure of the mobile terminal 100 (e.g., a tablet computer) will now be described in detail with reference to FIG. 2, which is a front perspective view of the mobile terminal 100. Referring to FIG. 2, the exterior of the mobile terminal 100 includes a front case 100-1 and a rear case 100-2. Various electronic devices can be installed in the space formed by the front case 100-1 and the rear case 100-2. The front case 100-1 and the rear case 100-2 may also be formed of a synthetic resin through injection molding. Alternatively, the front case 100-1 and the rear case 100-2 may be formed of a metal such as stainless steel (STS) or titanium (Ti).

In addition, as shown, the display module 151, the audio output module 153, the camera 121, and the user input unit 130 can be disposed in the main body of the mobile terminal 100, and particularly, on the front case 100-1. As discussed above, when a touch pad is configured to overlap the display module 151 and thus to form a mutual layer structure, the display module 151 may serve as a touch screen. Thus, the user can enter various information to the mobile terminal 100 simply by touching the display module 151.

Also, the audio output module 153 may be implemented as a receiver or a speaker, and the camera 121 can capture a still or moving image of the user. The microphone 123 can also receive the user's voice or other sounds. Another user input unit and an interface unit may be additionally provided on one side of the front case 100-1 or the rear case 100-2.

Further, the user input unit 130 may employ any mechanism and additional provide tactile feedback. For example, the user input unit 130 may be implemented as a dome switch or a touch pad that can receive a command or information according to a pressing or a touch operation by the user, or may be implemented as a wheel or jog type for rotating a key or as a joystick. In terms of function, the user input unit 130 may operate as function keys for entering commands, such as start, end, or scroll, numbers and symbols, for selecting an operating mode for the mobile terminal 100, and for activating a special function within the mobile terminal 100.

Another camera may be additionally provided on the rear case 100-2. The camera at the rear of the mobile terminal 100 may have an image capture direction which is substantially the opposite to that of the camera 121, which is provided at the front of the mobile terminal 100, and may have a different resolution from that of the camera 121. For example, the camera 121 may be configured to have a low resolution and thus be suitable for quickly capturing an image or video of the user's face and immediately sending the image or video to the other party during video conferencing. Meanwhile, the camera at the rear of the mobile terminal 100 may be configured to have a high resolution and thus be suitable for capturing more detailed, higher quality images or videos which typically do not need to be transmitted immediately.

Another audio output module may be additionally provided on the rear case 100-2. The audio output module on the rear case 100-2 can also realize a stereo function along with the audio output module 153 on the front case 100-1. The audio output module on the rear case 100-2 may also be used in a speaker-phone mode.

In addition, a broadcast signal reception antenna may be disposed at one side of the front or rear case 100-1 or 100-2, in addition to an antenna (105) used for call communication. The broadcast signal reception antenna may be installed such that it can be extended from the front or rear case 100-1 or 100-2. Further, a power supply unit may be mounted on the rear case 100-2 and supply power to the mobile terminal 100. The power supply unit may be, for example, a chargeable battery which can be detachably combined to the rear case 100-2 for being charged.

Figure 3B:
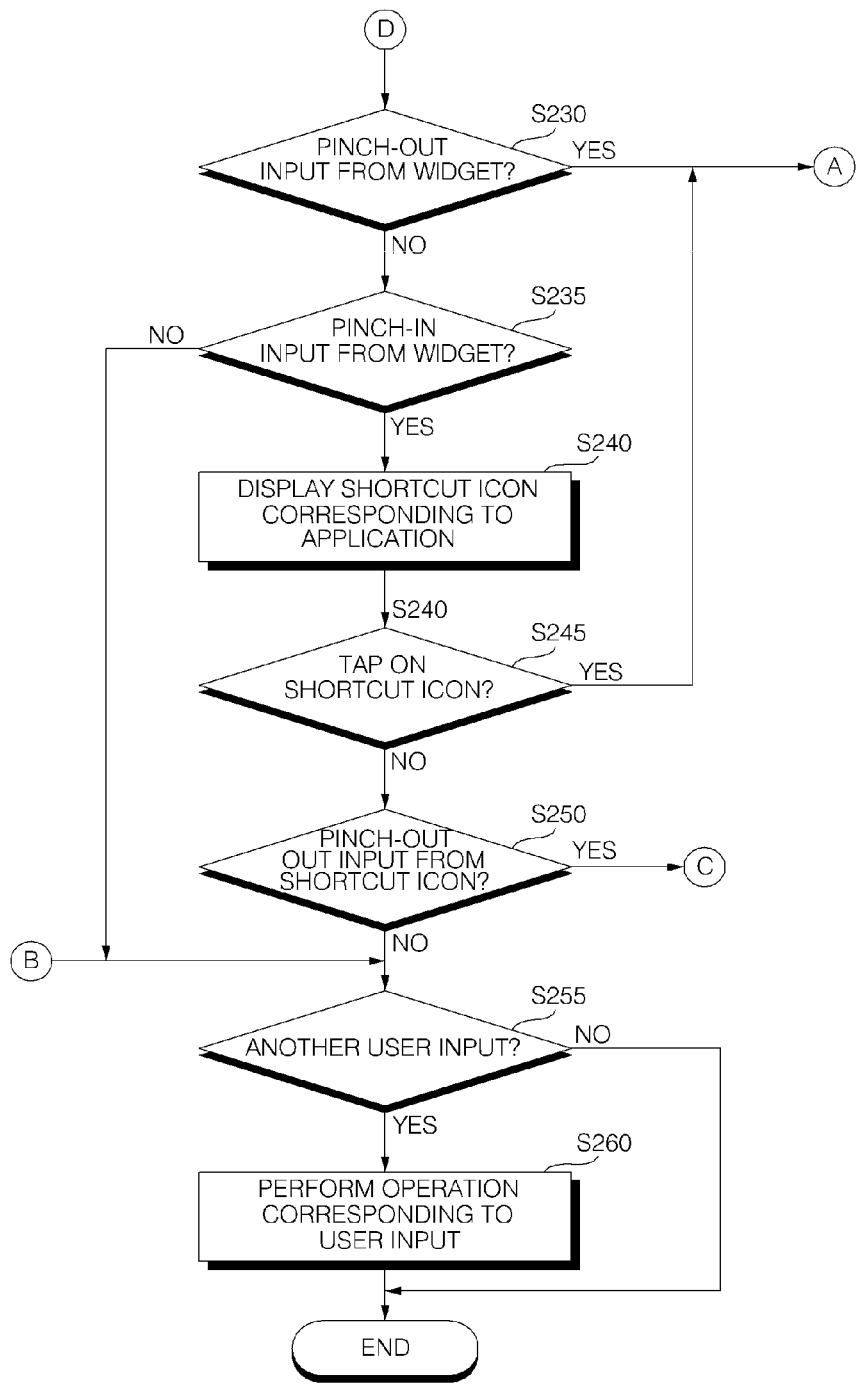

Next, FIGS. 3A and 3B are flow charts illustrating a method of controlling a mobile terminal according to an embodiment of the present invention. Referring to FIG. 3A, when a request for the execution of a predetermined application is issued in response to a user command being received, the controller 180 executes the predetermined application (S200). The controller 180 then displays an application screen corresponding to the predetermined application on the display module 151 (S205).

Further, the execution of the predetermined application may include executing an operation menu such as making or receiving a voice call or a video call, sending a message, accessing the internet or executing a broadcast viewer, a camera menu, a game menu, an image viewer menu, or a multimedia file player, and performing a function or program provided by the mobile terminal 100.

The controller 180 then determines whether there is a reduction input operation performed (e.g., pinching-in input operation) on the application screen (S210). For example, a pinching-in input operation is a user input generated by performing a multi-touching operation on the display module 151 with two fingers and moving the two fingers closer to each other, and is also referred to as a pinch-close or zoom-out input. A pinching-in input operation can also be used to reduce an image or a webpage.

When the controller 180 determines there is a pinching-in input operation (Yes in S210), the controller 180 reduces the application screen in response to the pinching-in input operation (S215). When the application screen is reduced below a predetermined size in response to the pinching-in input operation (S220), the controller 180 displays a widget corresponding to the predetermined application instead of the application screen on the display module 151 (S225).

In more detail, widgets are small applications designed to facilitate access to frequently-used functions or information. That is, widgets are independently-executable web applications that are easy to develop and distribute, can be combined with various applications or services, and can be optimized for various UIs to provide only content or information relevant to the various UIs. Widgets can be classified into accessory widgets such as clock or calendar widgets, application widgets such as games or contact lists, or information widgets such as weather forecasts or stock information. Other type of widgets may also be used.

Referring to FIG. 3B, in response to the widget being displayed, the controller 180 determines whether there is an increasing input operation (e.g., a pinching-out input operation) detected on the widget (S230). In more detail, a pinching-out input operation is a user input generated by multi-touching on the display module 151 with two fingers and moving the two fingers away from each other, and is also referred to as a pinch-open or zoom-in input. A pinching-out input operation may be used to enlarge an image or a webpage.

When the controller 180 determines there is a pinching-out input operation detected on the widget (Yes in S230), the controller 180 displays the application screen back on the display module 151 (S205). On the other hand, when the controller 180 detects a pinching-in input operation on the widget (Yes in S235), the controller 180 displays a shortcut icon corresponding to the predetermined application instead of the widget on the display module 151 (S240).

When the controller 180 detects a tap on the shortcut icon (Yes in S245), the controller 180 displays the application screen back on the display module 151 (S205). When the controller 180 detects a pinching-out input operation on the shortcut icon (Yes in S250), the controller 180 displays the widget instead of the shortcut icon on the display module 151 (S225). Also, when another input operation other than a pinching-in or pinching-out input operation such as a key input is received (Yes in S255), the controller 180 performs an operation corresponding to the received user input (S260).

According to this embodiment, it is possible to easily switch between an application screen display mode, a widget display mode, and an icon display mode in response to a pinching-in or pinching-out input operation and thus to effectively control various operations performed by the mobile terminal 100.

Figure 4:
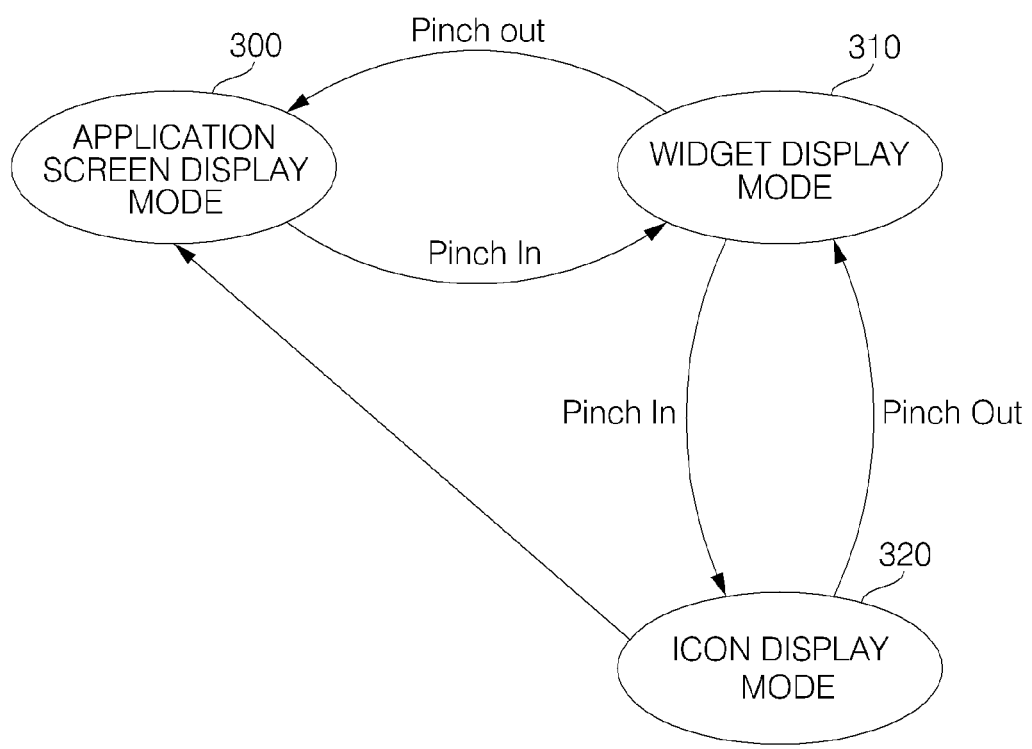
FIG. 4 is a diagram illustrating the embodiment of FIGS. 3A and 3B.

Next, FIG. 4 is a flow diagram illustrating the embodiment of FIGS. 3A and 3B, and particularly, an example of how to switch between an application screen display mode, a widget display mode, and an icon display mode. Referring to FIG. 4, when an application screen is reduced below a predetermined size in response to a pinching-in input operation during an application screen display mode 300, the mobile terminal 100 is switched to a widget display mode 310.

When a pinching-out input operation is detected on a widget during the widget display mode 310, the mobile terminal 100 is switched to the application screen display mode 300. When a pinching-in input operation is detected on a widget during the widget display module 310, the mobile terminal 100 is switched to an icon display mode 320. Further, when a tap on an icon is detected during the icon display mode 320, the mobile terminal 100 is switched to the application screen display mode 300, and the application screen displayed during the previous application screen display mode is displayed back on the display module 151.

Also, when a pinching-out input operation is detected from a shortcut icon during the icon display mode 320, the mobile terminal 100 is switched to the widget display mode 310. In this manner, it is possible to effectively switch from one display mode to another display mode in response to a pinch-in or pinching-out input operation.

Figure 5:
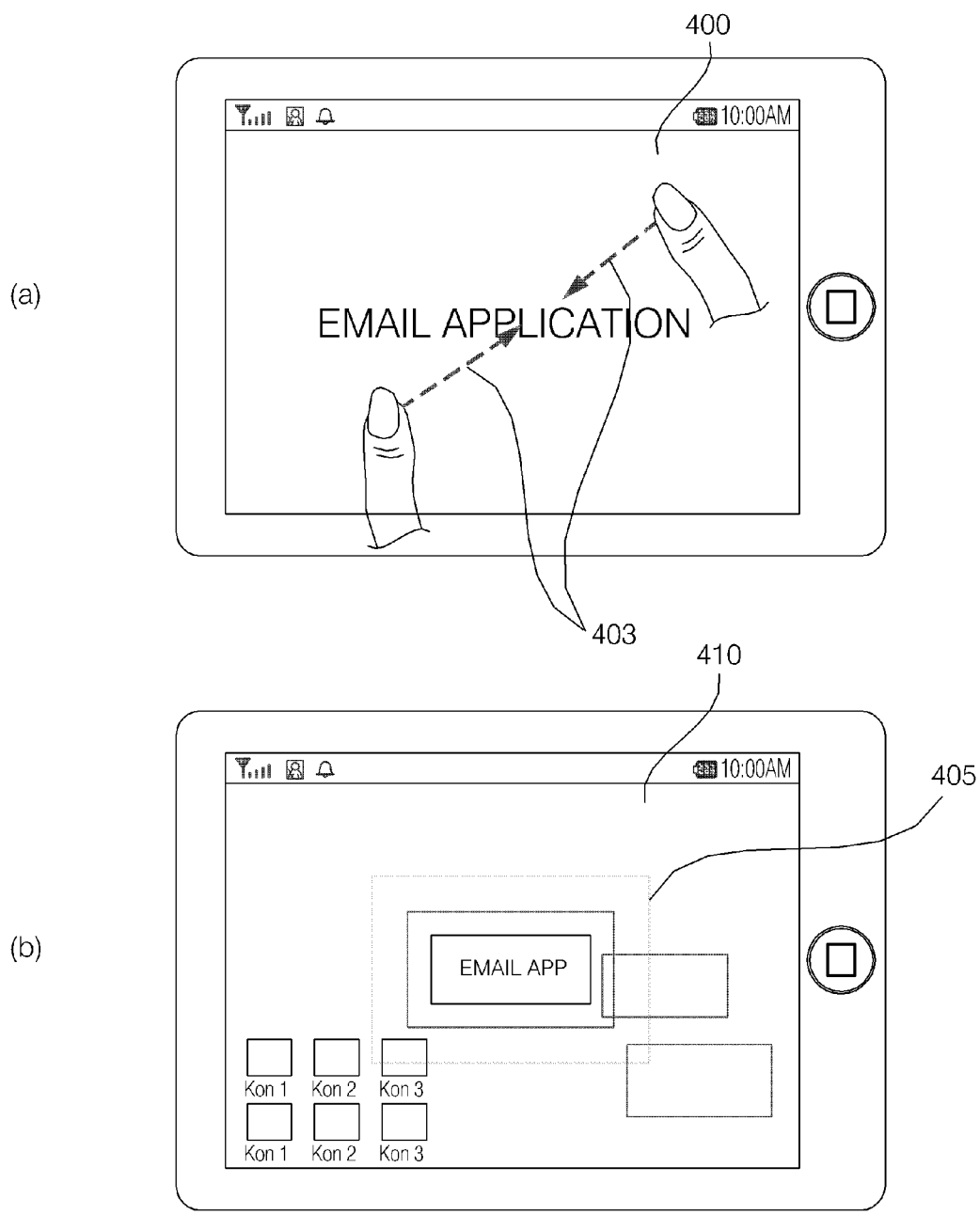

Next, FIGS. 5 through 17 illustrate display screens for explaining the embodiment of FIGS. 3A and 3B. Referring to FIGS. 5(*a*) and 5(*b*), when the controller 180 detects a pinching-in input operation 403 on an email screen 400, which is displayed in response to the execution of an email application, a display screen 410 including a reduced email screen 405 obtained by reducing the email screen 400 in response to the pinching-in input operation 403 is displayed. When the email screen 400 is reduced below a predetermined size in response to the pinching-in input operation 403, the controller 180 displays an email widget 415 corresponding to the email application as illustrated in FIG. 6(*a*).

Figure 6:
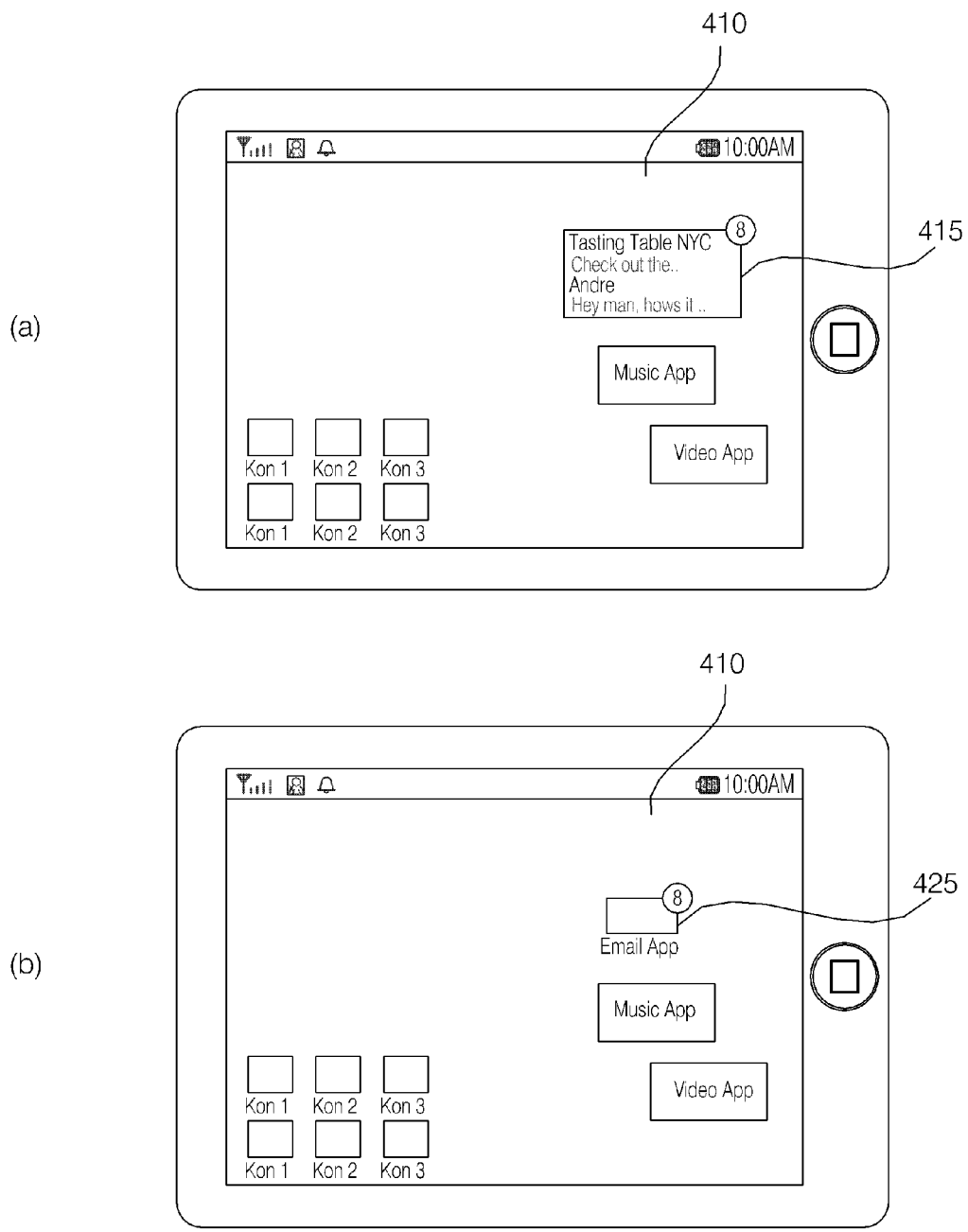

When the controller 180 detects a pinching-in input operation on the email widget 415, the controller 180 displays a shortcut icon 425 corresponding to the email application instead of the email widget 415 as illustrated in FIG. 6(*b*). Referring to FIG. 7(*a*), an email widget displays the content 417 of a most-recently received email and the number 419 of unread emails. Referring to FIG. 7(*b*), a shortcut icon corresponding to an email application displays the number 427 of unread emails.

As described above with reference to FIGS. 5 through 7, a widget or a shortcut icon corresponding to an application may be configured to display additional information regarding the execution of the application. A user can also set in advance what information should be displayed as the additional information.

Figure 8:
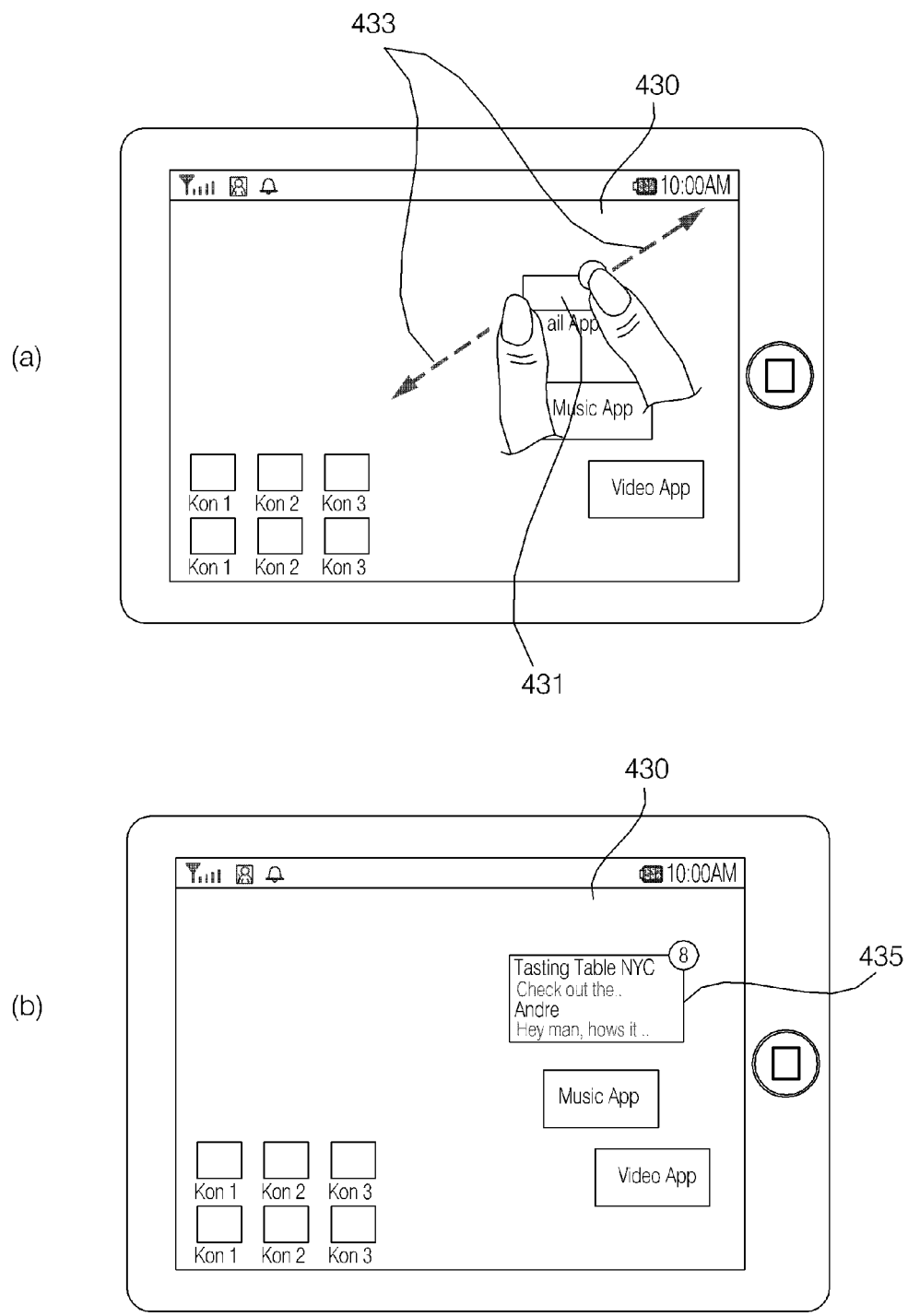
Figure 9:
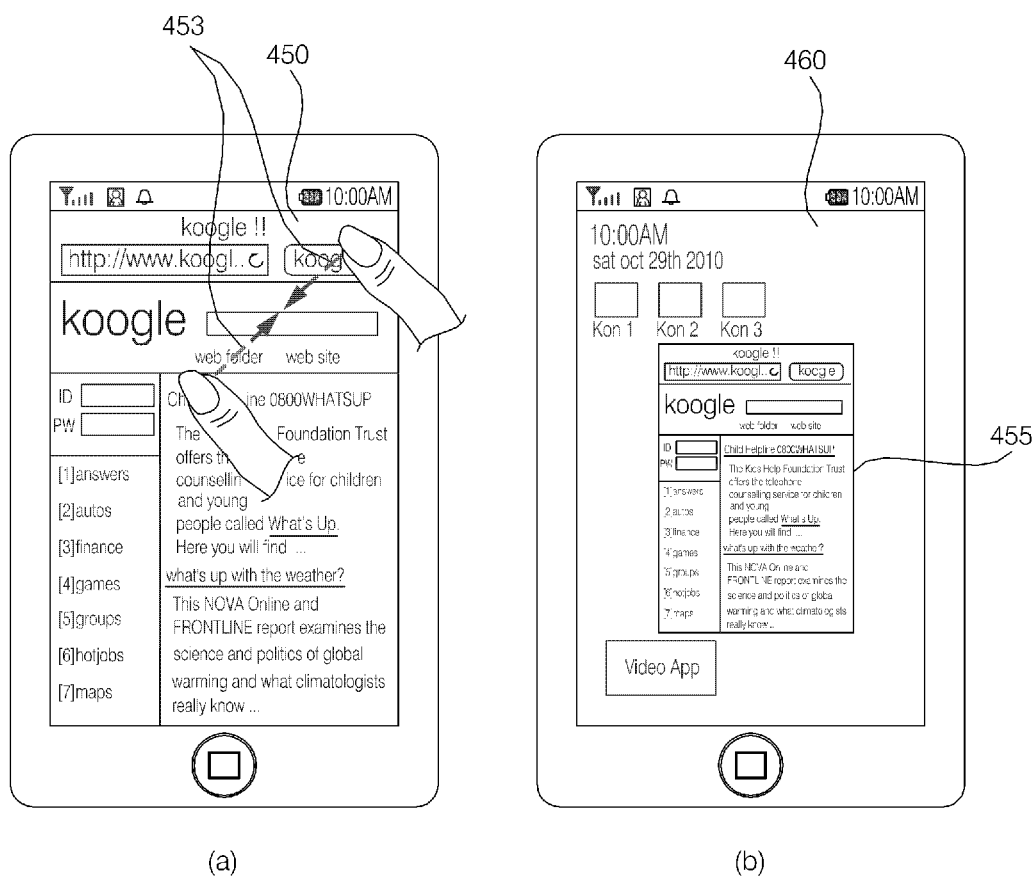
Figure 10:
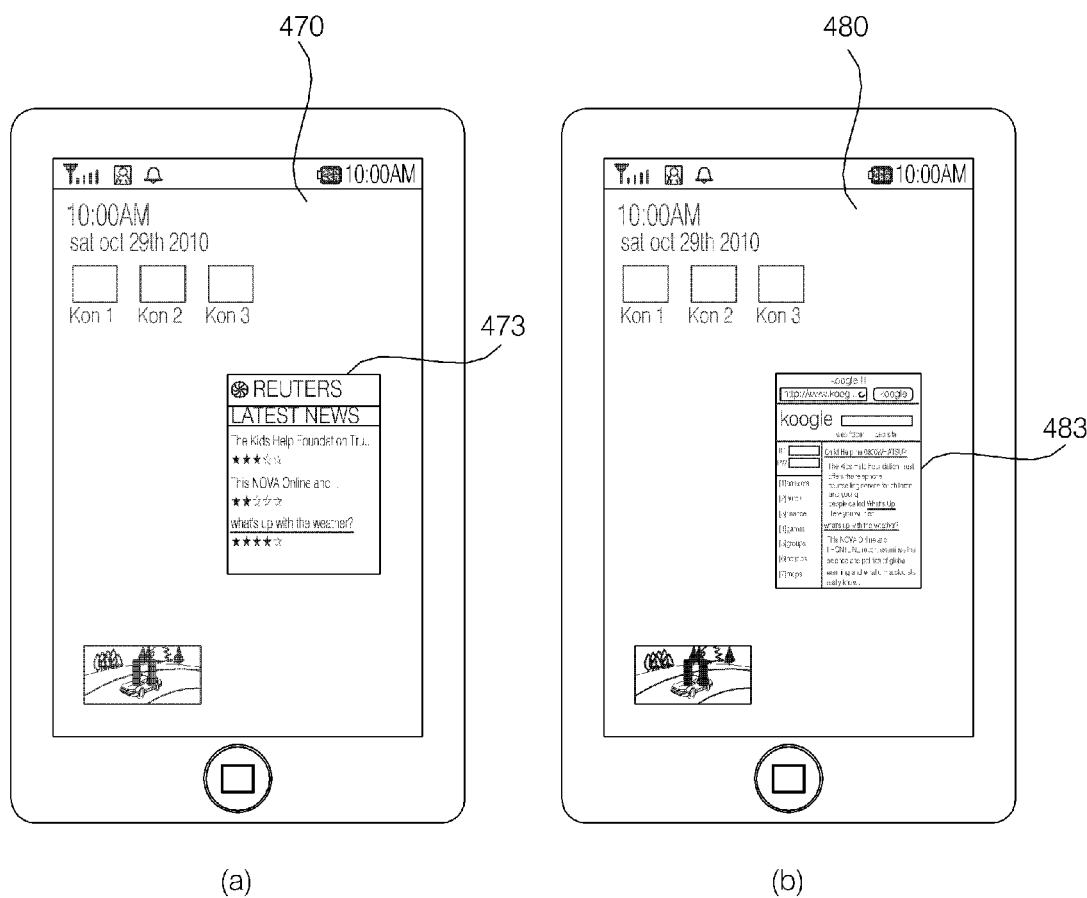
Figure 11:
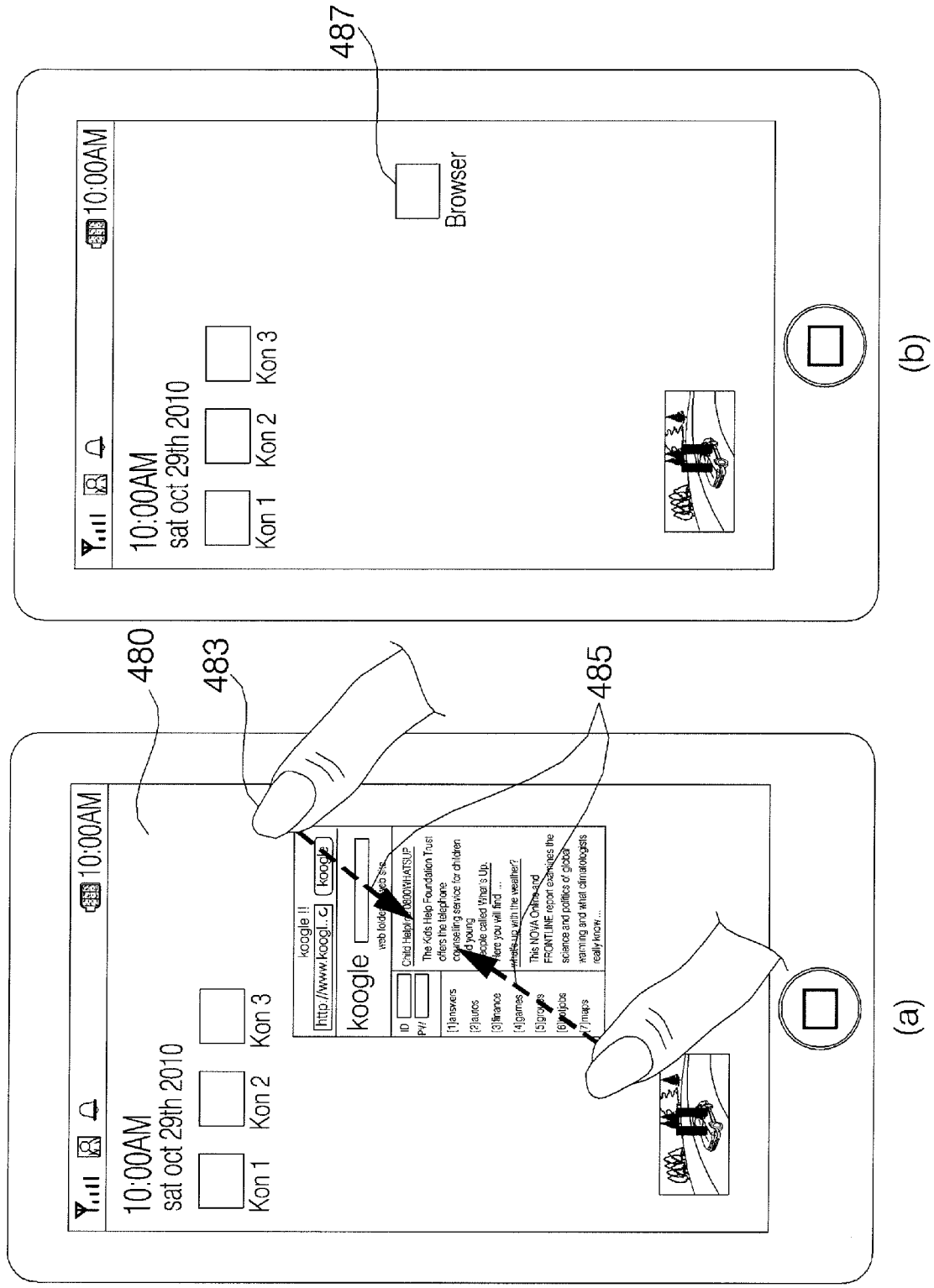
Figure 13:
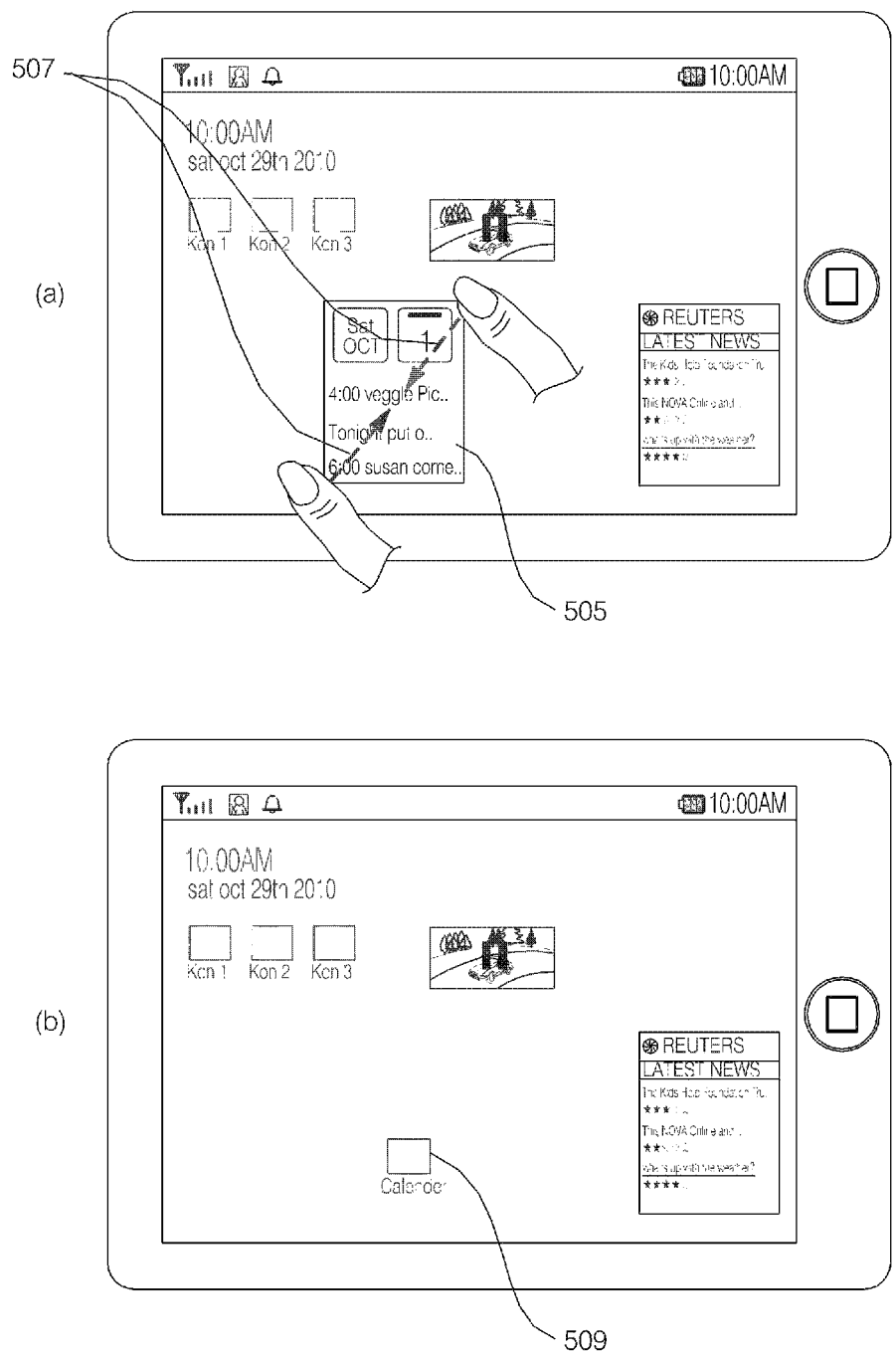
Figure 16:
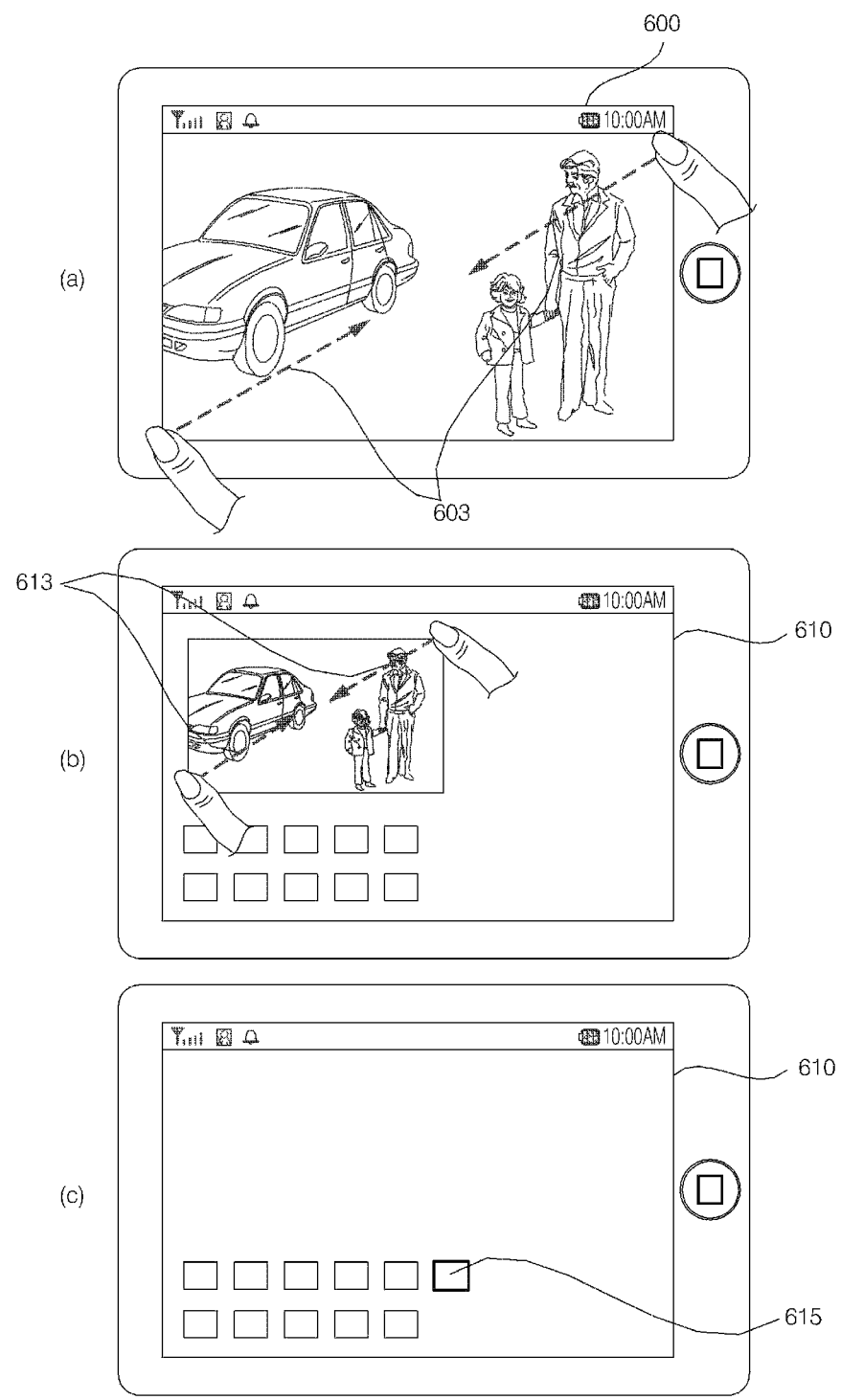

Referring to FIGS. 8(*a*) and 8(*b*), when the controller 180 detects a pinching-out input operation 433 on a display screen 430 showing a shortcut icon 431, the controller 180 displays a widget 435 instead of the shortcut icon 431. When the controller 180 detects a pinching-out input operation on the widget 435 or a tap on the shortcut icon 431, the controller 180 displays an application screen corresponding to the widget 435.

Referring to FIGS. 9(a) and 9(b), when the controller 180 detects a pinching-in input operation 453 on a webpage screen 450, which is displayed on the entire display module 151, the controller 180 displays a display screen 460 including a reduced webpage screen 455 obtained by reducing the webpage screen 450 in response to the pinching-in input operation 453. When the webpage screen 450 is reduced below a predetermined in response to the pinching-in input operation 453, the controller 180 displays a widget 473 corresponding to the webpage screen 450 as illustrated in FIG. 10(a).

Referring to FIG. 10(a), when a website corresponding to the webpage screen 450 provides a resource description framework (RDF) site summary (RSS), the controller 180 displays a display screen 470 including an RSS widget 473. On the other hand, referring to FIG. 10(b), when the website corresponding to the webpage screen 450 does not provide an RSS, the controller 180 displays a display screen 480 including a typical widget 483 corresponding to the webpage screen 450. Further, RSS is a family of web feed formats used for online information providers to syndicate or distribute various web content items such as news headlines to web users.

Referring to FIGS. 11(a) and 11(b), when the controller 180 detects a pinching-in input operation 485 on the widget 483 of the display screen 480, the controller 180 displays a shortcut icon 487 corresponding to the webpage screen 450 instead of the widget 483. Referring to FIGS. 12(a) and 12(b), when a display screen 500 displayed on the entire display module 151 is reduced below a predetermined size in response to a pinching-in input operation 503 being detected on the display screen 500, the controller 180 displays a calendar widget 505 including the current date and other date-related information.

Referring to FIGS. 13(a) and 13(b), when the controller 180 detects a pinching-in input operation 507 on the calendar widget 505, the controller 180 displays a shortcut icon 509 including the current date. Referring to FIGS. 14(a) and 14(b), when a music album screen 540 is reduced below a predetermined size in response to a pinching-in input operation 543 being detected on the music album screen 540, the controller 180 displays a display screen 550 including one or more widgets regarding an album title or regarding the playing of the music.

Referring to FIGS. 15(a) and 15(b), when a pinching-in input operation 553 is detected on the widget regarding the playback of music, the controller 180 displays a shortcut icon 557 corresponding to the music album screen 540. Referring to FIGS. 16(a) and 16(b), when a pinching-in input operation 603 is detected on a video player screen 600, the controller 180 displays a display screen 610 including a widget regarding the playback of a video file. Referring to FIGS. 16(b) and 16(c), when a pinching-in input operation 613 is detected on the widget regarding the playback of a video file, the controller 180d displays a display screen 610 including a shortcut icon 615 corresponding to the playback of a video file aligned along with other icons.

Further, when the mobile terminal 100 is switched from an application screen display mode to a widget display mode in response to a pinching-in input operation during the playback of a video file, the controller 180 can temporarily stop the playback of the video file. When the mobile terminal 100 is switched back to the widget display mode in response to a pinching-out input operation, the controller 180 can display a video player screen previously displayed during the last previous application screen display mode back on the display module 151, and resume the playback of the video file.

Referring to FIGS. 17(a) and 17(b), when the controller 180 detects a pinching-in input operation 633 on a weather forecast screen 630, the controller 180 displays a display screen 640 including a widget 643 displaying current weather information based on a user's current location. Referring to FIGS. 17(b) and 17(c), when the controller 180 detects a pinching-in input operation 645 on the widget 643, the controller 180 displays a display screen 650 on which a shortcut icon 653 corresponding to the weather forecast screen 630 is aligned with other icons.

Further, in another embodiment of the present invention, the controller 180 can displays the widgets in a slide mode in response to a pinching-in input operation being detected from a gallery screen. Further, the controller 180 can display widgets including/displaying recently-updated Twitter feeds in response to a pinching-in input operation being detected on a Twitter screen. In still another embodiment of the present invention, the controller 180 can display widgets including/displaying recently-created memos in response to a pinching-in input operation being detected from a list of memos. In addition, the controller 180 can convert an application screen providing an alarm function or a music player function into a widget displaying/including the current date and time in response to a pinching-in input operation being detected on the application screen.

In still another embodiment of the present invention, the controller 180 can convert a stock screen into a stock widget including/displaying daily stock market indexes and stock prices in response to a pinching-in input operation being detected from the stock screen. The controller 180 can also convert a document viewer screen into a widget having a recently-viewed document page as its cover in response to a pinching-in input operation being detected from the document viewer screen. However, the present invention is not restricted to the embodiments set forth herein, and can be applied to various application screens.

Further, the present invention can be realized as code that can be read by a processor (such as a mobile station modem (MSM)) included in a mobile terminal and that can be written on a computer-readable recording medium. The computer-readable recording medium may be any type of recording device in which data is stored in a computer-readable manner Examples of the computer-readable recording medium include a ROM, a RAM, a CD-ROM, a magnetic tape, a floppy disc, an optical data storage, and a carrier wave (e.g., data transmission through the internet). The computer-readable recording medium can be distributed over a plurality of computer systems connected to a network so that computer-readable code is written thereto and executed therefrom in a decentralized manner. Functional programs, code, and code segments needed for realizing the present invention can be easily construed by one of ordinary skill in the art.

As described above, according to embodiments of the present invention, it is possible to control various operations performed by a mobile terminal such as switching between an application screen display mode and a shortcut icon display mode in response to a pinch-in or pinching-out input operation. In addition, it is possible to improve the convenience of the manipulation of a mobile terminal by using a pinching-in input operation and a pinching-out input operation together with other user inputs such as a key input or a touch input.

Further, the controller 180 can expand the application screen back to its original size before the reduction input operation has been performed when the application screen is not reduced below the predetermined size The present invention encompasses various modifications to each of the examples and embodiments discussed herein. According to the invention, one or more features described above in one embodiment or example can be equally applied to another embodiment or example described above. The features of one or more embodiments or examples described above can be combined into each of the embodiments or examples described above. Any full or partial combination of one or more embodiment or examples of the invention is also part of the invention.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A mobile terminal comprising:
    a wireless communication unit configured to wirelessly communicate with at least one other terminal;
    a touchscreen;
    a memory configured to store an application, an application icon relating to the application, and a widget relating to the application; and
    a controller configured to:
        control the touchscreen to display the application icon,
        execute the application in response to a first touch gesture on the application icon, the application being configured to display content items when executed,
        reduce a size of an application screen of the executed application in response to a first pinching-in input operation performed on the application screen,
        determine if the application screen is reduced below a predetermined size,
        control the touchscreen to display the widget corresponding to the application instead of the application screen when the application screen is reduced below the predetermined size,
        control the touchscreen to display the application icon corresponding to the application, instead of the widget, in response to a second pinching-in input operation performed on the widget,
        display the widget in response to a second touch gesture on the application icon, the widget being configured to display part of the content items of the application, the displayed part of the content items on the widget being different from information displayed on the application icon, and
        execute the application in response to a third touch gesture on the widget,
    wherein a first indicator is configured to be displayed on a corner of the application icon, and a second indicator is configured to be displayed on a corner of the widget, and
    wherein the second indicator has the same shape as the first indicator and comprises a circular image.

2. The mobile terminal of claim 1, wherein the controller is further configured to control the touchscreen to change the displayed part of the content items on the widget when the widget is displayed.

3. The mobile terminal of claim 2, wherein the controller is further configured to control the touchscreen to change the displayed part of the content items in a slide mode.

4. The mobile terminal of claim 1, wherein the application is a gallery application.

5. The mobile terminal of claim 1, wherein the first touch gesture is a tapping gesture operation on the application icon,
    wherein the second touch gesture is a pinching-out input operation on the application icon, and
    wherein the third touch gesture is a pinching out input operation on the widget.

6. The mobile terminal of claim 1, wherein when the executed application includes a video file, the controller is further configured to temporarily stop a playback of the video file when the widget is displayed instead of the application.

7. The mobile terminal of claim 6, wherein the controller is further configured to detect a pinching-out input operation on the widget corresponding to the playback of the video file, and to display a video player screen and resume the playback of the video file on the video screen player in response to the detected pinching-out input operation.

8. The mobile terminal of claim 1, wherein the controller is further configured to:
    determine whether there is a first type of touch gesture or a second type of touch gesture on the application icon, the first type of touch gesture being different from the second type of touch gesture,
    in response to determining that there is the first type of touch gesture on the application icon, execute the application, and
    in response to determining that there is the second type of touch gesture on the application icon, alternatively display the widget.

9. The mobile terminal of claim 1, wherein the application is an email application displaying email contents, the widget displays selected ones of the email contents and a number of new emails, and the application icon displays the number of new emails.

10. The mobile terminal of claim 1, wherein the application icon displays a notification relating to the content items overlaid thereon.

11. The mobile terminal of claim 1, wherein the controller is further configured to rearrange other display objects displayed on the touchscreen when the widget is changed into the application icon.

12. The mobile terminal of claim 1, wherein the controller is further configured to periodically update at least part of the content items of the application displayed on the widget.

13. A method of controlling a mobile terminal, the method comprising:
    allowing, via a wireless communication unit on the mobile terminal, wireless communication with at least one other terminal;
    displaying, on a touchscreen of the mobile terminal, an application icon relating to an application;
    executing, via a controller on the mobile terminal, the application in response to a first touch gesture on the application icon, the application being configured to display content items when executed;

reducing a size of an application screen of the executed application in response to a first pinching-in input operation performed on the application screen;

determining if the application screen is reduced below a predetermined size;

displaying, on the touchscreen, a widget corresponding to the application instead of the application screen when the application screen is reduced below the predetermined size;

displaying, on the touchscreen, the application icon corresponding to the application, instead of the widget, in response to a second pinching-in input operation performed on the widget;

displaying the widget in response to a second touch gesture on the application icon, the widget being configured to display part of the content items of the application, the displayed part of the content items on the widget being different from information displayed on the application icon; and executing the application in response to a third touch gesture on the widget, wherein a first indicator is configured to be displayed on a corner of the application icon, and a second indicator is configured to be displayed on a corner of the widget, and wherein the second indicator has the same shape as the first indicator and comprises a circular image.

14. The method of claim 13, further comprising changing the displayed part of the content items in a slide mode.

15. The method of claim 13, further comprising:
displaying information corresponding to execution of the application in the application icon; and
aligning the application icon with other icons being displayed in response to the second pinching-in input operation.

16. The method of claim 13, further comprising:
expanding, via the controller, the application screen back to its original size before the first pinching-in input operation has been performed when the application screen is not reduced below the predetermined size.

17. The method of claim 13, wherein the first touch gesture is a tapping input operation on the application icon,
wherein the second touch gesture is a pinching-out input operation on the application icon, and
wherein the third touch gesture is a pinching out input operation on the widget.

18. The method of claim 13, further comprising rearranging other display objects displayed on the touchscreen when the widget is changed into the application icon.

19. The method of claim 13, further comprising periodically updating at least part of the content items of the application displayed on the widget.

\* \* \* \* \*